United States Patent [19]

Kurahashi et al.

[11] Patent Number: 5,589,930
[45] Date of Patent: Dec. 31, 1996

[54] OPTICAL RADAR APPARATUS

[75] Inventors: Akira Kurahashi, Kouta-cho; Hirosi Ando, Nichiharu-cho; Toshiyuki Kaneiwa, Kounan; Yoshiaki Hoashi, Toyota, all of Japan

[73] Assignee: Nippondenso Co., Ltd., Kariya, Japan

[21] Appl. No.: 204,180

[22] PCT Filed: Sep. 9, 1992

[86] PCT No.: PCT/JP92/01151

§ 371 Date: Feb. 25, 1994

§ 102(e) Date: Feb. 25, 1994

[87] PCT Pub. No.: WO93/06505

PCT Pub. Date: Jan. 4, 1993

[30] Foreign Application Priority Data

Sep. 13, 1991 [JP] Japan ................................. 3-234832

[51] Int. Cl.$^6$ .................. G01C 3/08; G03B 3/00
[52] U.S. Cl. .............. 356/5.01; 356/4.01; 396/106
[58] Field of Search ................. 356/4.01, 5.01; 354/403

[56] References Cited

U.S. PATENT DOCUMENTS

| | | |
|---|---|---|
| 4,678,288 | 7/1987 | Lonsdale et al. |
| 4,907,026 | 3/1990 | Koyama et al. ............ 354/403 |
| 4,924,507 | 5/1990 | Chao et al. |
| 5,125,735 | 6/1992 | Oizumi et al. ............ 354/403 |
| 5,305,047 | 4/1994 | Hayakawa et al. .......... 354/403 |

FOREIGN PATENT DOCUMENTS

| | | |
|---|---|---|
| 59-117980 | 8/1984 | Japan . |
| 59-117981 | 8/1984 | Japan . |
| 63-190983 | 12/1988 | Japan . |
| 2-306513 | 12/1990 | Japan . |
| 3-14478 | 2/1991 | Japan . |

*Primary Examiner*—Stephen C. Buczinski
*Attorney, Agent, or Firm*—Cushman Darby & Cushman; IP Group of Pillsbury; Madison & Sutro LLP

[57] ABSTRACT

The invention aims to increase an expansion angle in a road surface direction in a short-distance area without setting a detection range one-sidedly and without sacrificing a maximum detection distance.

A double-focus lens is integrally formed by disposing a short-focus portion in the vicinity of a center and a long-focus portion on the periphery of the short-focus portion. A light source is disposed at a distance slightly shorter than the focal length of the short-focus portion of the double-focus lens. When light is emitted from the light source to the double-focus lens, light emerging from the short-focus portion has a small expansion angle such as not to diffuse largely. Therefore, the emerging light can be caused to reach a long distance. On the other hand, light emerging from the long-focus portion has a large expansion angle such as to diffuse to some extent. Therefore, the emerging light can be caused to travel over a short-distance area and, more particularly, over an area extended in a widthwise direction of a road surface.

8 Claims, 11 Drawing Sheets

5,589,930

OPTICAL RADAR APPARATUS

TECHNICAL FIELD

This invention relates to an optical radar apparatus, and is used, for example, for a constant-speed traveling apparatus and an optical radar apparatus capable of accurately detecting the position of a vehicle, an obstacle or the like moving closer to a detection-side vehicle.

BACKGROUND ART

As optical radar apparatuses capable of setting a detection area in a widthwise direction of a road surface, there are apparatuses such as those disclosed in Japanese Utility Model Laid-Open Nos. 59-117980 and 59-117981.

In the apparatus disclosed in Japanese Utility Model Laid-Open No. 59-117980, shown in FIGS. 7A and 7B, light from a light source is condensed to some extent by a lens to obtain a first detection range θT1, and the light source is suitably moved to obtain a second detection range θT2 wider than the first detection range θT1 in a widthwise direction of a road surface by changing the degree of condensing of the lens.

In the apparatus disclosed in Japanese Utility Model Laid-Open No. 59-117981, shown in FIG. 8, light from a light source traveling through a lens is diffused by a prism to increase an expansion angle in a road surface direction, thereby setting a detection range wide in a widthwise direction of a road surface.

In the apparatus disclosed in Japanese Utility Model Laid-Open No. 59-117980 among the above-described conventional apparatuses, shown in FIGS. 7A and 7B, however, light cannot be emitted simultaneously for the first detection range θT1 and the second detection range θT2, and the detection range is set one-sidedly, since the detection range is changed by moving the light source.

The apparatus disclosed in Japanese Utility Model Laid-Open No. 59-117981, shown in FIG. 8, entails the problem of a reduction in the maximum detection distance because light is uniformly diffused by the prism. Because of this problem, it is not possible to meet a demand heretofore made for widening the detection range in a widthwise direction of a road surface in a short-distance area without reducing the maximum detection distance when an optical radar apparatus is used for an inter-vehicle control or an obstacle detecting apparatus.

The present invention has been achieved in consideration of the above-described problems, and an object of the present invention is to provide an optical radar apparatus capable of increasing the expansion angle in a road surface direction in a short-distance range without setting the detection range one-sidedly and without sacrificing the maximum detection distance.

DISCLOSURE OF INVENTION

According to the present invention, an optical radar apparatus is therefore adopted in which a beam of light is emitted from a light transmitter, reflected light from an object is received by a light receiver, and the distance to the object is detected on the basis of a light transmitting-receiving relationship, the light transmitter having:

an optical device formed of at least a first focus portion having a first focal length, and a second focus portion having a second focal length at least longer than the first focal length; and a light source provided in a position at a distance equal to or shorter than the first focal length from the optical device, the light source emitting light to the optical device so that light travels to the outside through the first focus portion and the second focus portion.

In the above-described arrangement, the optical device provided in the light transmitter is formed of at least the first focus portion and the second focus portion, and the light source provided in the light transmitter is provided in a position at a distance equal to or shorter than the first focal length from the optical device, and emits light to the optical device so that light travels to the outside through the first focus portion and the second focus portion.

Accordingly, light emerging from the first focus portion in the light emitted from the light source to the optical device has a small expansion angle such as not to diffuse largely and, therefore, can be caused to reach a long distance. On the other hand, light emerging from the second focus portion has a large expansion angle such as to diffuse to some extent and, therefore, can be caused to travel over a short-distance area and, more particularly, over an area extended in a widthwise direction of a road surface.

BEST MODE FOR CARRYING OUT THE INVENTION

Figure 1:
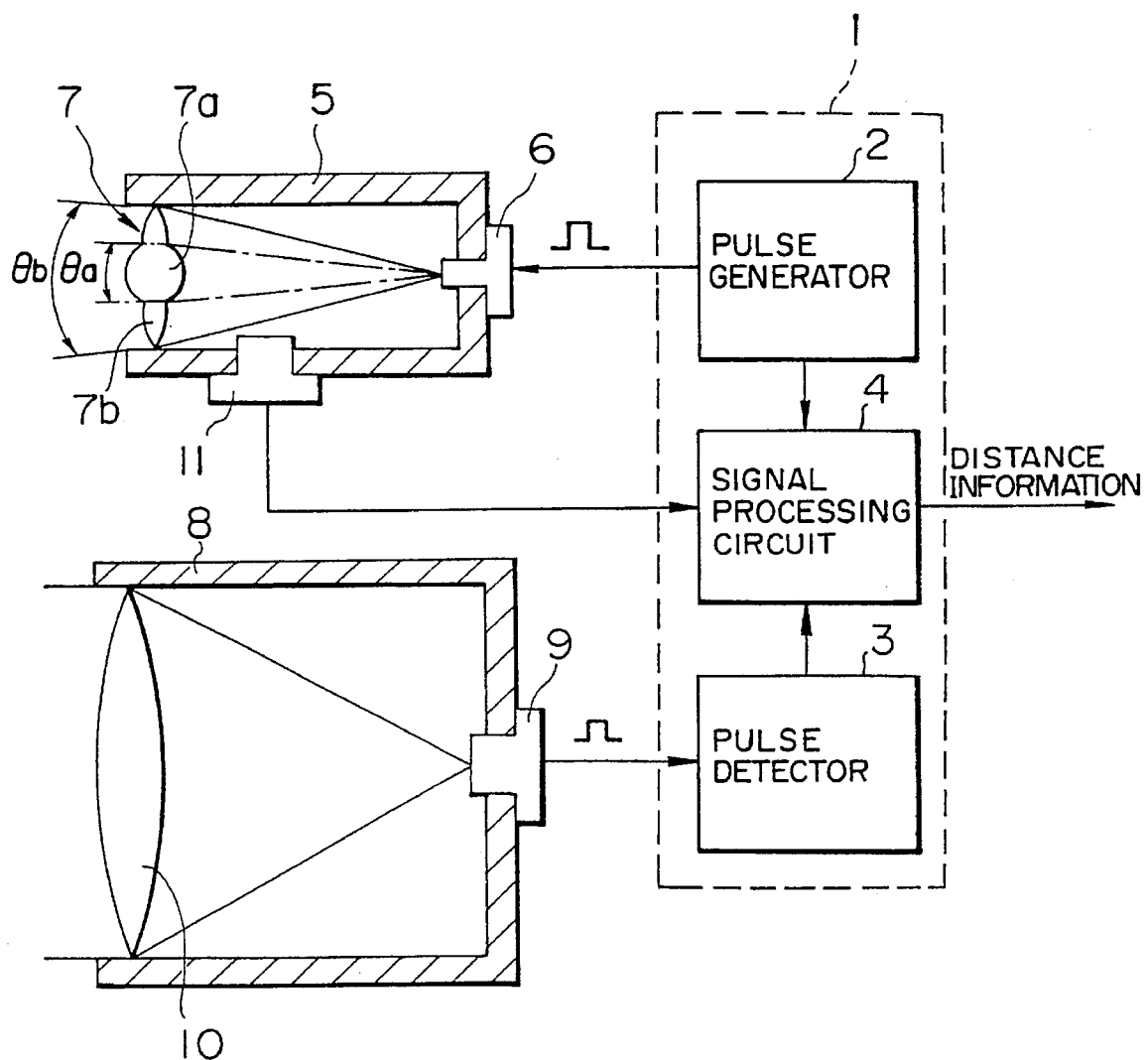
FIG. 1 is a configurational diagram showing a first embodiment of the present invention.

The present invention will be described below with respect to embodiments illustrated in the drawings.

FIG. 1 is a configurational diagram showing a first embodiment of the present invention.

Referring to FIG. 1, a light transmitter 5 formed of a box-like member is constituted by a light source 6 which emits pulse-like light by a drive pulse signal and which is formed of a semiconductor laser diode fixed on the light transmitter 5, a double-focus lens 7 (corresponding to an optical device) integrally formed of glass, plastic or the like in such a manner that a short-focus potion 7a (corresponding to a first focus portion) is placed about its center and a long-focus portion 7b l(corresponding to a second focus portion), and a photodiode 11 with which a light emitting state of the light source 6 is monitored.

Specifically, the light source 6 is disposed at a distance slightly smaller than the focal length of the short-focus portion 7a of the double-focus lens such that light is emitted through the short-focus portion 7a at a narrow-expansion angle $\theta a$ while light is emitted through the long-focus portion 7b at a wide expansion angle $\theta b$, thereby enabling the light emitted through the short-focus portion 7a to cover a long-distance area and the light emitted through the long-focus portion 7b to cover a short-distance area which is an area extended to the left and light (i.e., a widthwise direction of a road surface). Details of the double-focus lens will be described later.

On the other hand, a light receiver 8 formed of a box-like member is constituted by an optical system 10 which condenses light reflected by a reflex reflector or the like of a vehicle in front, and a photodiode 9 which receives condensed light (pulse-like light) and which photoelectrically converts the received light.

A control circuit 1 is constituted by a pulse generator 2 which generates a drive pulse signal to the light source 6, a pulse detector 3 which detects a pulse signal from the photo diode 9, and a signal processing circuit 4 in which a transmission delay time from a light emission start to a light receiving detection is obtained from an emission start signal from the pulse generator 2 (or a monitor signal (pulse signal) from the photo diode 11) and a light receiving detection signal from the pulse detector 3, and in which the distance to the reflector (vehicle in front) is measured on the basis of this transmission delay time. In the signal processing circuit 4, a confirmation is also made as to whether the light source 6 is suitably emitting light on the basis of the monitor signal from the photodiode 11.

The operation of the above-described arrangement will now be described.

When a drive pulse signal is generated from the pulse generator 2, the light source 6 emits pulse-like light to the double-focus lens 7. From the double-focus lens 7, the light emitted from the light source 6 is emitted at the narrow-expansion angle $\theta a$ by the short-focus portion 7a and at the wide-expansion angle $\theta b$ by the long-focus portion 7b. At this time, the light emitting state of the light source 6 is monitored with the photodiode 11, and an emission start signal corresponding to the start of emitting light is output from the pulse generator 2 to the signal processing circuit 4.

If part of the light emitted from the light transmitter 5 is reflected by a reflex reflector or the like of a vehicle in front, it is condensed on the photodiode 9 by the optical system 10, and a pulse signal is generated by photoelectric conversion in the photodiode 9. The generated pulse signal is immediately detected by the pulse detector 3, and a receiving detection signal corresponding to the received light detection is output to the signal processing circuit 4.

Then, in the signal processing circuit 4, a transmission delay time from the light emission start to the light receiving detection is obtained from the emission start signal from the pulse generator 2 (or the monitor signal (pulse signal) from the photodiode 11) and the light receiving detection signal from the pulse detector 3, and the distance to the reflector (vehicle in front) is measured on the basis of this transmission delay time. The result of this measurement is output as distance information to an unillustrated display unit or the like to be displayed.

The relationship between the focal lengths and emergence angles of the double-focus lens 7 will next be described.

Figure 2:
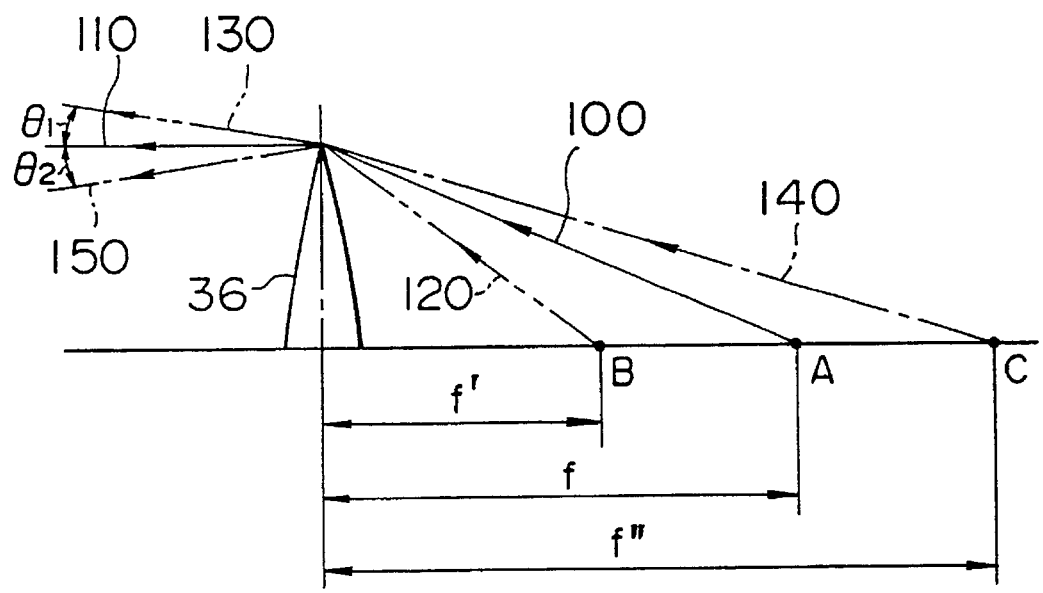
FIG. 2 is a conceptional configurational diagram for explaining the relationship between a focal length and an emergence angle of an ordinary convex lens.

FIG. 2 is a conceptional configurational diagram for explaining the relationship between a focal length and an emergence angle of an ordinary convex lens. Referring to FIG. 2, a condenser lens such as a convex lens 36 has a characteristic such that if a point light source is placed at a point A which is located at a distance corresponding to a focal length f from the center of the convex lens 36, light 100 from the point A becomes parallel light 110 by passing through the convex lens 36.

On the other hand, if the point light source is placed at a point B which is located at a distance f' shorter than the focal length f from the center of the convex lens 36, light 120 traveling from the point B and passing through the convex lens 36 emerges from the convex lens 36 as light 130 having an expansion angle $\theta 1$ proportional to a distance ratio f'/f. Further, if the point light source is placed at a point C which is located at a distance f'' longer than the focal length f from the center of the convex lens 36, light 140 traveling from the point C and passing through the convex lens 36 emerges from the convex lens 36 as light 150 having a convergence angle $\theta 2$ proportional to a distance ratio f''/f.

Figure 3:
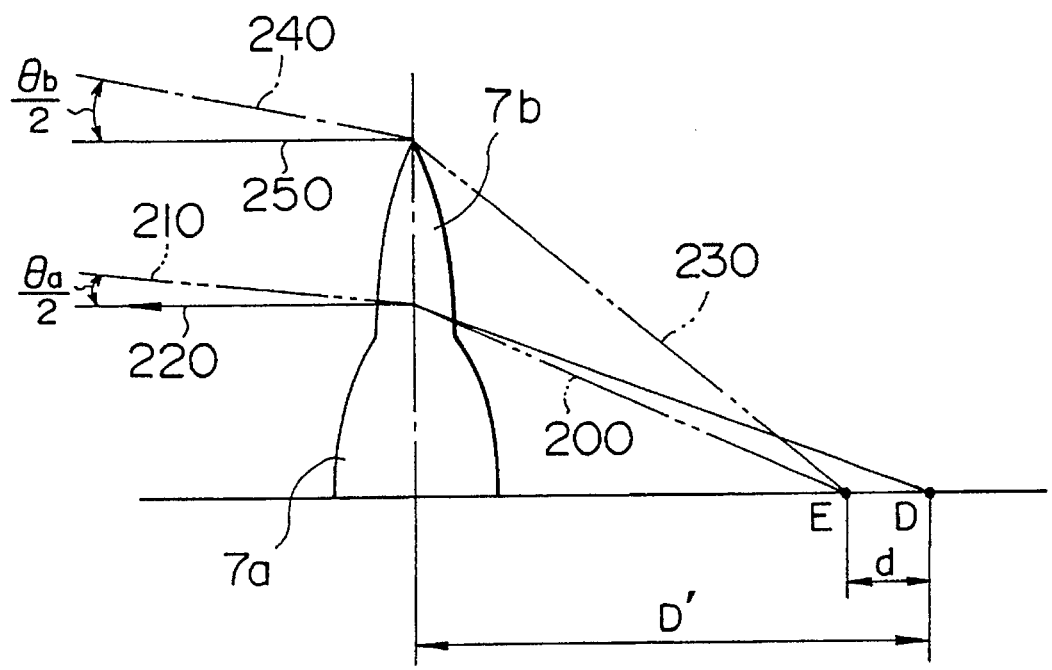
FIG. 3 is a conceptional configurational diagram for explaining focal lengths and emergence angles of a double-focus lens 7 in the first embodiment.

From this general characteristic, the relationship between the focal lengths of and emergence angles of the above-mentioned double focus lens 7 is considered to be as shown in FIG. 3, which is a conceptional configurational diagram for explaining the relationship between the focal lengths of and emergence angles of the above-mentioned double focus lens 7.

Referring to FIG. 3, the above-mentioned light source 6 is placed at a point E which is shifted a distance d toward the center of the double-focus lens 7 from a point D which is at a distance D' from the lens center corresponding to the focal length D of the short-focus portion 7a. Then, with respect to light 200 and 230 emerging from the light source 6, light 200 emitted from the light source 6 emerges at an expansion angle of $\theta a/2$ from parallel light 220 which is obtained when the light source 6 is placed at the point D. On the other hand, light 230 emerges at an expansion angle $\theta b/2$ ($\theta a<\theta b$) from parallel light 250 which is obtained when the light source 6 is placed in an unillustrated position at a distance corresponding to the focal length of the long-focus portion 7b from the center of the double-focus lens 7.

Accordingly, light 210 emerging from the short-focus portion 7a has a small emergence angle (i.e., expansion angle) such as not to diffuse largely. Therefore, the emerging light can be caused to reach a long distance. On the other hand, light 240 emerging from the long-focus portion 7b has a large emergence angle such as to diffuse to some extent. Therefore, the emerging light can be caused to travel over a short-distance area and, more particularly, over an area extended in a widthwise direction of a road surface.

Next, an emergence pattern of light from the above-described double-focus lens 7 will be described with reference to the conceptional diagram of FIG. 4, in which the coordinate represents detection distance L (m) from the light transmitter 5 while the abscissa represents detection width W (m), and in which broken lines designate an emergence pattern of light in the case of using the above-mentioned convex lens 36 (FIG. 2).

Figure 4:
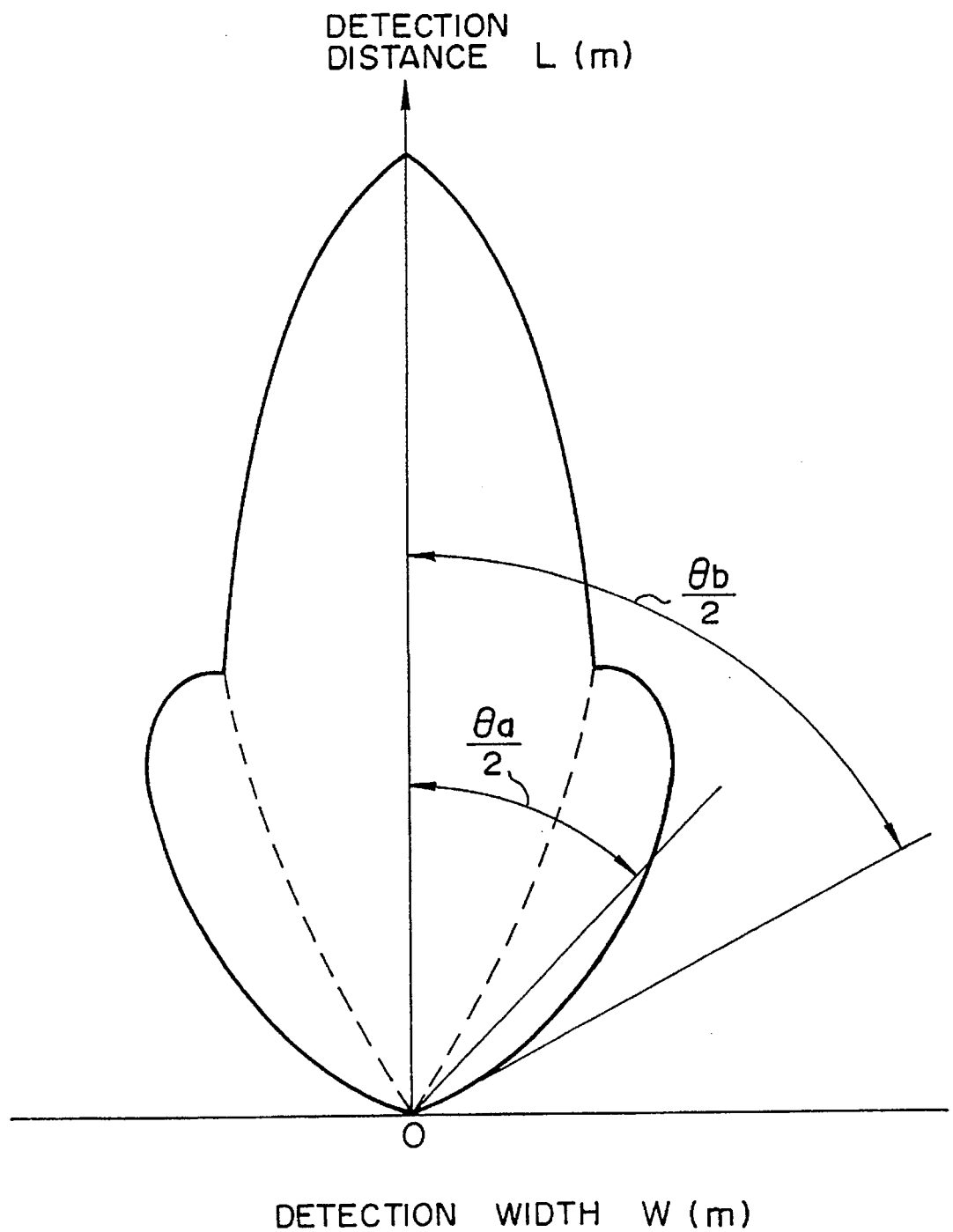
FIG. 4 is a conceptional diagram conceptually showing an emergence pattern of light from the double-focus lens 7.

As shown in FIG. 4, light emerging from the short-focus portion 7a covers the short-distance area with the expansion angle θa/2 from a center, while light emerging from the long-focus portion covers a long-distance area with the expansion angle θb/2 from the center.

As shown in FIG. 4, the detection distance changes with a change in the emergence angle depending upon the ratio of the areas of the short-focus portion 7a and the long-focus portion 7b as well as the factor based on the above-described emergence angle. That is, the intensity of light emerging from each of the short-focus portion 7a and the long-focus portion 7b is proportional to the glass area. Therefore, a farthest detection distance and a nearest detection distance can be set by setting the area ratio of the glass area of the short-focus portion 7a and the glass area of the long-focus portion 7b.

In the first embodiment of the present invention, as described above, two detection areas, i.e., a long-distance area and a short-distance area can be provided without suitably moving the light source 6. Therefore, the detection range is not set one-sidedly and there is no need to provide a drive circuit for moving the light source.

Also, the double-focus lens 7 formed of the short-focus portion 7a and the long-focus portion 7b is used to diffuse light emitted from the light source 6 to different extents (an extent such that diffused light closer to parallel light and a larger extent of diffusion). It is thereby possible to extend the detection width of the short-distance area without sacrificing the maximum detection distance to realize a detection area suitable for an inter-vehicle control or obstacle detection apparatus.

In the above-described first embodiment, an emergence pattern of light from the double-focus lens 7, such as that shown in FIG. 4, is illustrated. However, any other desired emergence pattern can be formed by independently changing the focal lengths of the short-focus portion 7a and the long-focus portion 7b forming the double-focus lens 7, the distance between the double-focus lens 7 and the light source 6, and the ratio of the areas of the short-focus portion 7a and the long-focus portion 7b of the double-focus lens 7.

The optical system of the light transmitting section may be formed of any multiple focus system other than the double-focus lens according to one's need. Further, the light transmitter 5 and the light receiver 8 may be arranged integrally with each other (by combining the two box-like units into one unit), although they are separately arranged in the above-described first embodiment. The same can also be said with respect to second to sixth embodiments described below.

The second embodiment of the present invention will be described with reference to FIG. 5. In the second embodiment, a transmission type hologram 18 is used as an optical system for a light transmitter instead of the double-focus lens 7 of the first embodiment. A control circuit 12, a pulse generator 13, a signal processing circuit 14, a pulse detector 15, a light transmitter 16, a light source 17, a light receiver 19, a photodiode 20, an optical system 21, and a photodiode 22 are the same as the corresponding components of the first embodiment and, therefore, will not be explained.

Figure 5:
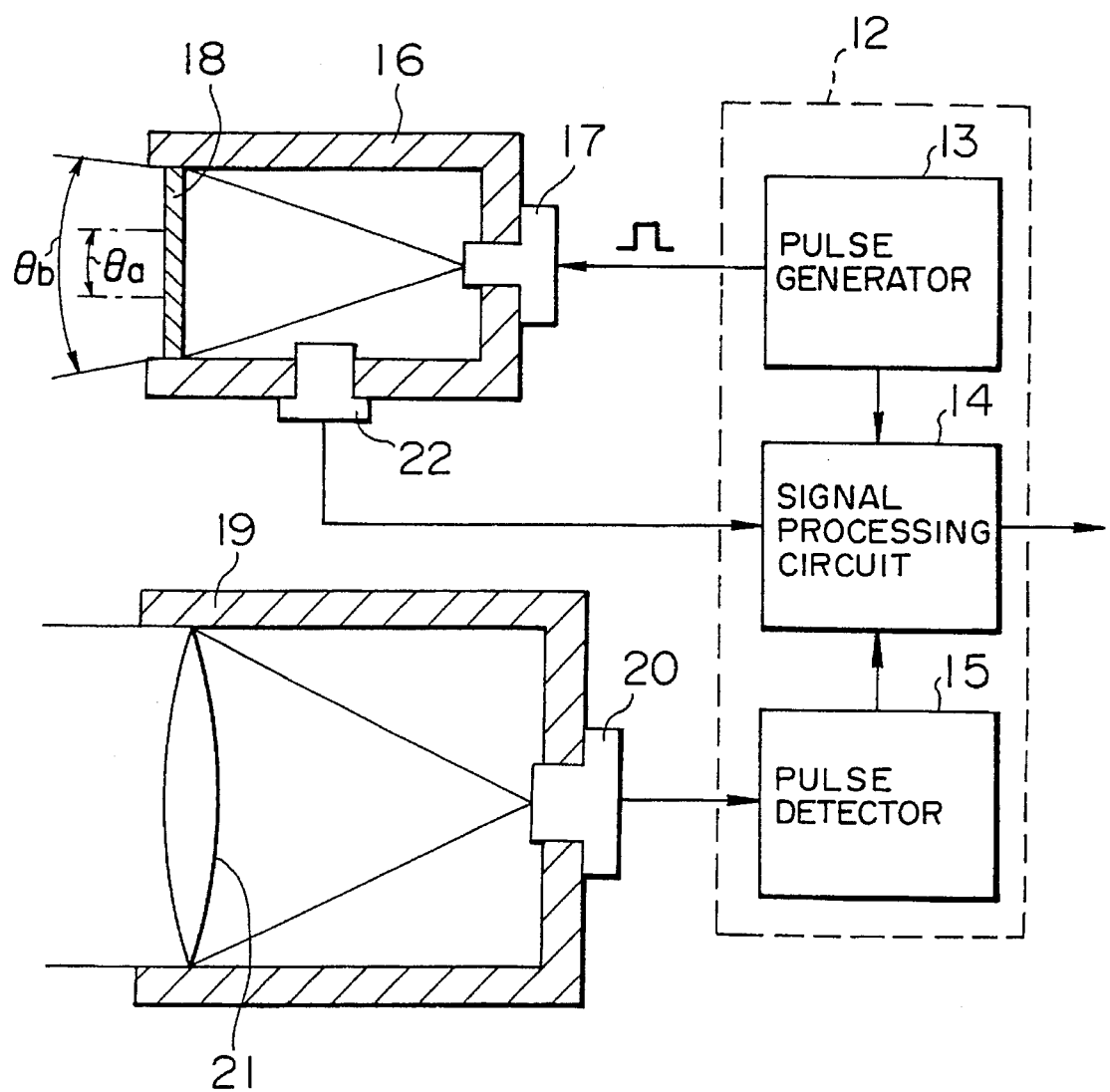
FIG. 5 is a configurational diagram showing a second embodiment of the present invention.

Referring to FIG. 5, the transmission type hologram 18 of this embodiment (corresponding to the optical device) can distribute, for example, light having a small distortion in light waveform at an emission center of the light source to a short focus and a long focus at any ratio (evenly in some case) because the transmission type hologram 18 can be manufactured as a transmission type hologram 18 having a short focus and a long focus existing mixedly by multiple exposure, while in the case of the double-focus lens 7 of the first embodiment there is a need to divide the internal region of the lens into the short-focus portion 7a and the long-focus portion 7b. Therefore, it is possible to easily control a dispersion of the distance measuring accuracy with respect to an area covered by the short-focus portion (long-distance area) and an area covered by the long-focus portion.

Next, the third embodiment of the present invention will be described with reference to FIG. 6. In the third embodiment, a reflection type hologram 31 is used as an optical system for a light transmitter instead of the double-focus lens 7 of the first embodiment. A control circuit 23, a pulse generator 24, a signal processing circuit 25, a pulse detector 26, a light transmitter 27, a light source 28, a light receiver 32, a photodiode 33, an optical system 34, and a photodiode 35 are the same as the corresponding components of the first embodiment and, therefore, will not be explained.

Figure 6:
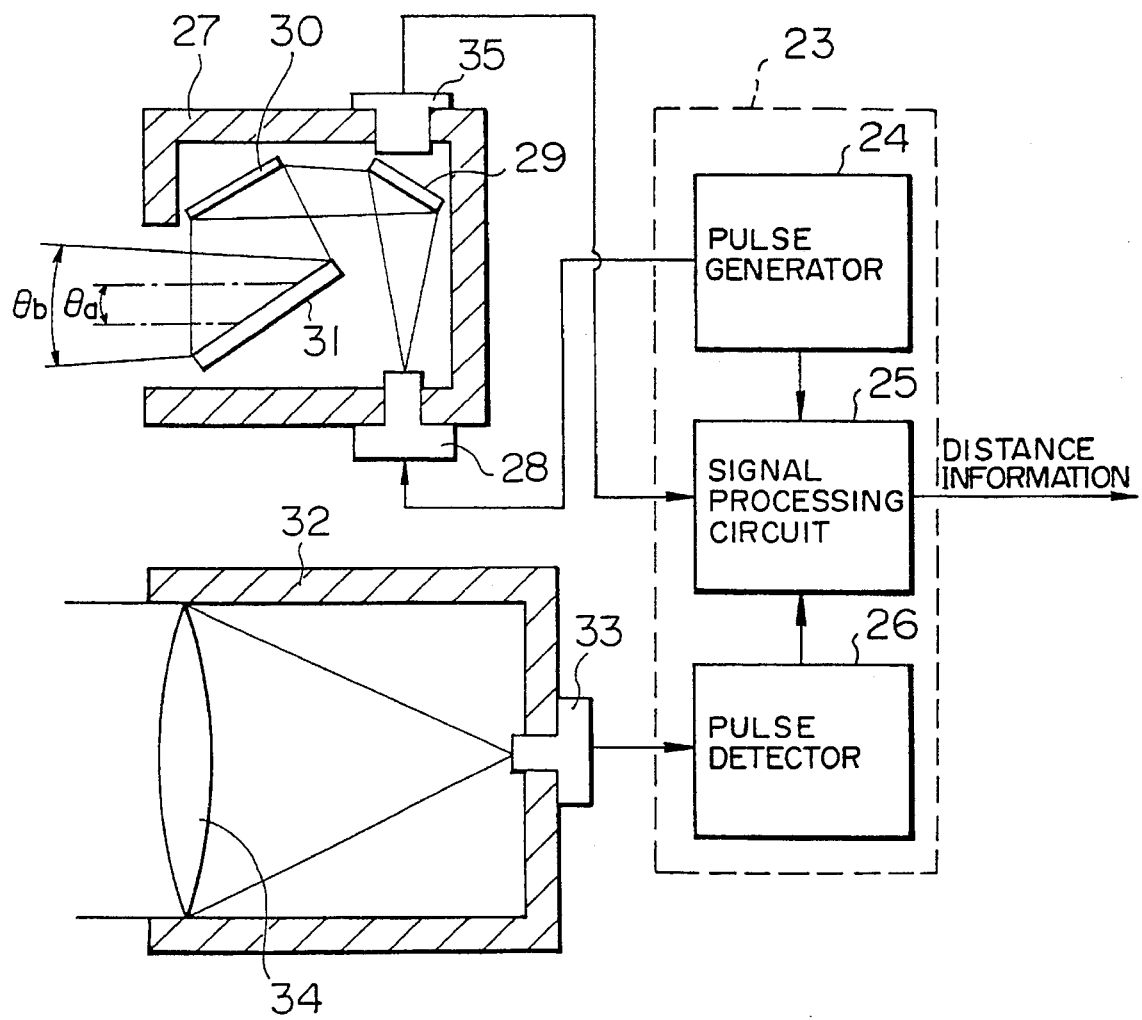
FIG. 6 is a configurational diagram showing a third embodiment of the present invention.
Figure 7A:
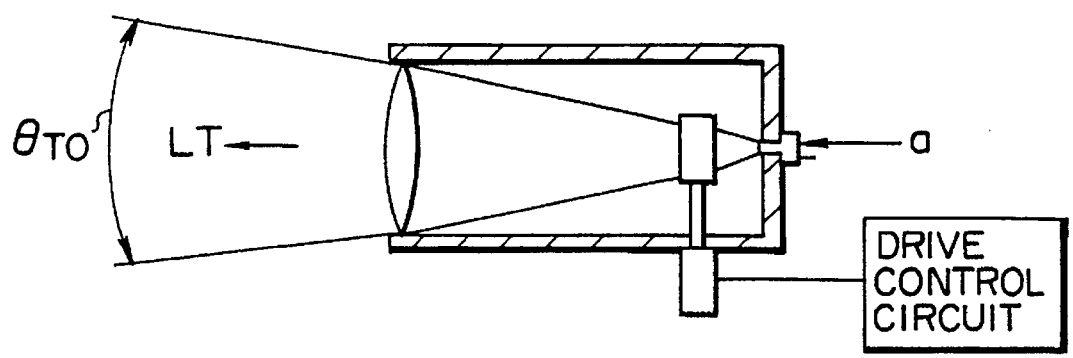
FIGS. 7A and 7B are configurational diagrams showing the configuration of a conventional art.
Figure 7B:
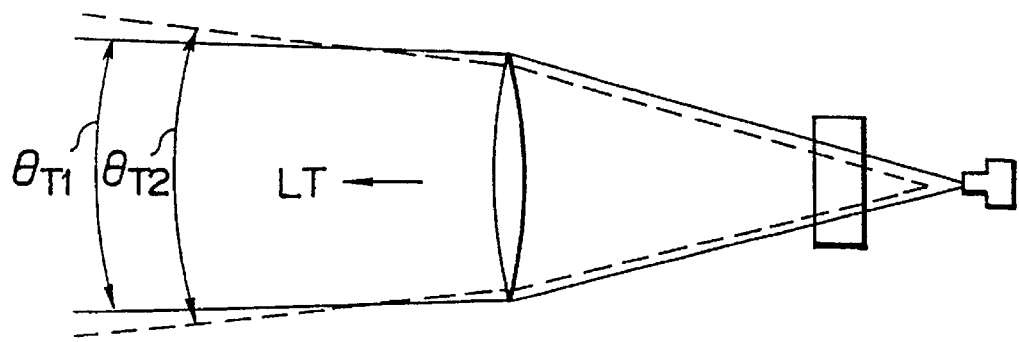
Figure 8:
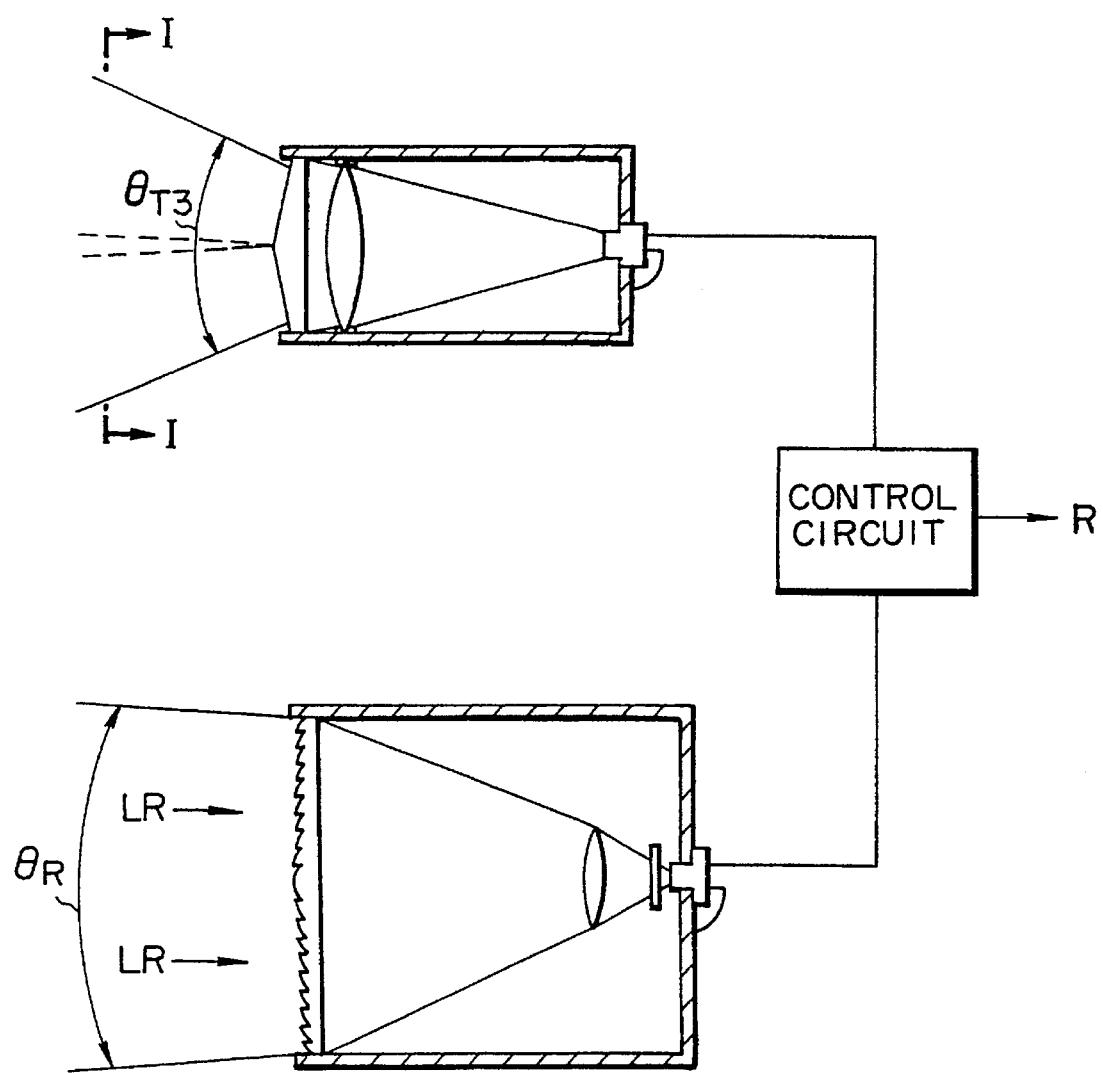
FIG. 8 is a configurational diagram showing the configuration of another conventional art.

Referring to FIG. 6, the reflection type hologram 31 (corresponding to the optical device) can be manufactured as a hologram having a short focus and a long focus existing mixedly by multiple exposure, as in the case of the above-described second embodiment. Accordingly, the angle of incidence upon the reflection type hologram 31 is set according to the placement relationship between mirrors 29 and 30 and the light source 28 by considering the reflection angle of the reflection type hologram 31. It is not necessary to use the mirrors 29 and 30 if the angle of incidence upon the reflection type hologram 31 can be set only by the placement of the light source 28 alone.

Figure 9:
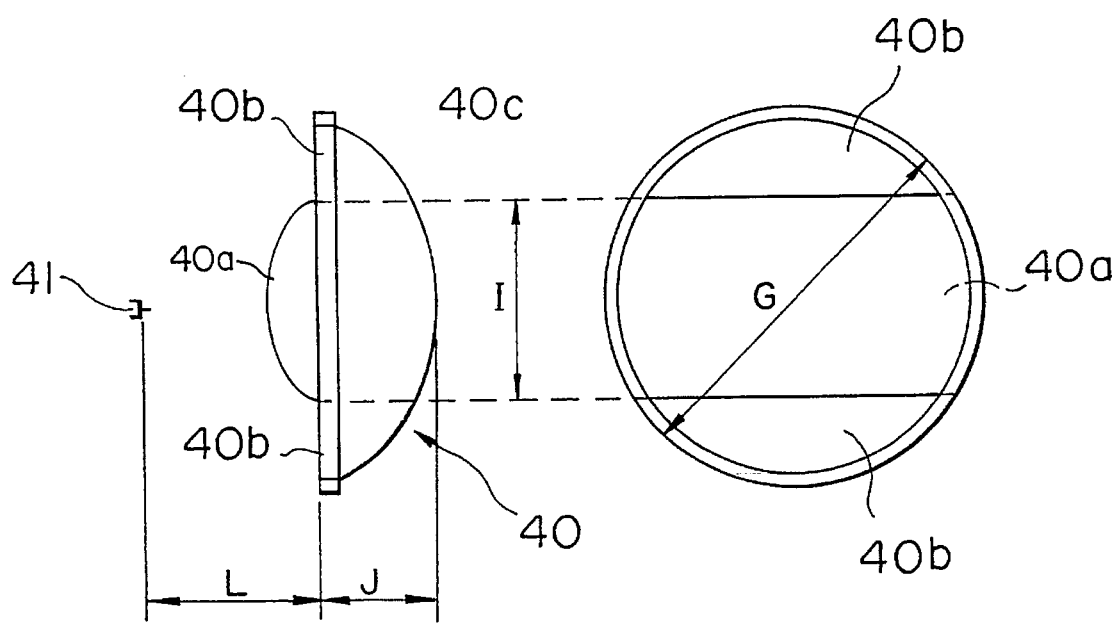
FIG. 9 is a configurational diagram showing the configuration of a multiple focus lens 40 in a fourth embodiment of the present invention.

Next, the fourth embodiment of the present invention will be described with reference to FIG. 9. In the fourth embodiment, as shown in FIG. 9, a multiple focus lens 40 having a shape different from that of the double-focus lens 7 of the first embodiment is used. This multiple focus lens 40 has a cylindrical surface 40a for causing an emergence of light at the expansion angle θa for a long-distance area (FIG. 1) and a flat surface 40b for causing an emergence of light at the expansion angle θb for a short-distance area (FIG. 1).

Referring to FIG. 9, the multiple focus lens 40 is formed of the cylindrical surface 40a having a predetermined radius of curvature, the flat surface 40b and an aspherical surface 40c. The cylindrical surface 40a actually has a radius of curvature much larger than the radius of curvature of the aspherical surface 40c.

In the fourth embodiment, by the above-described arrangement, the cylindrical surface 40a and the aspherical surface 40c cause an emergence of light at the expansion angle θa for a long-distance area (FIG. 1), while the flat surface 40b and the aspherical surface 40c cause an emergence of light at the expansion angle θb for a short-distance area (FIG. 1).

Figure 10A:
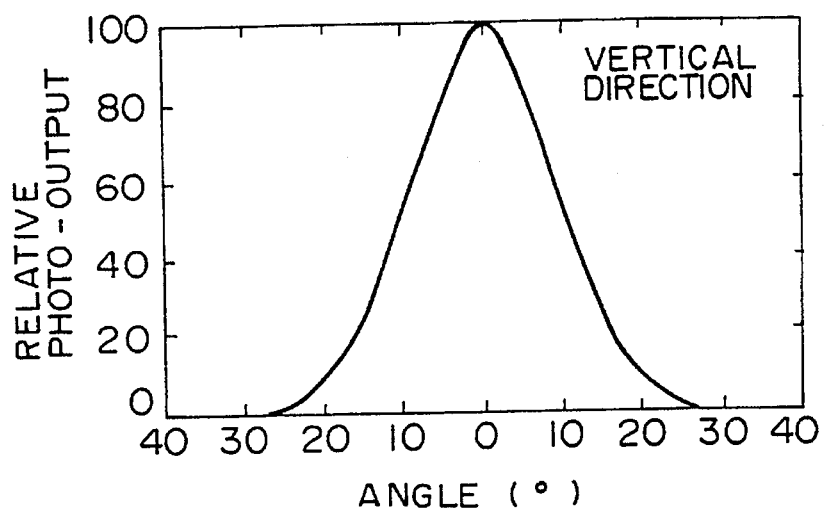
FIGS. 10A and 10B are characteristic diagrams showing characteristics of a semiconductor laser diode for use in the fourth and fifth embodiments of the present invention.
Figure 10B:
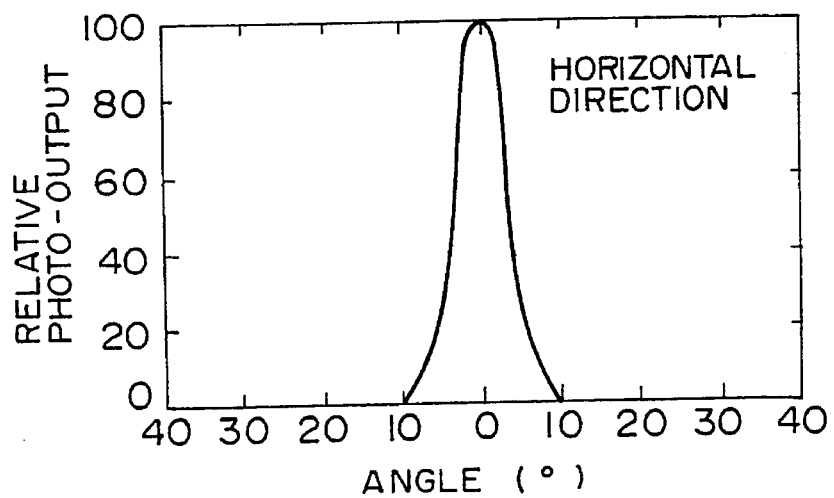

An example of the arrangement shown in FIG. 9 will be described below in which an outside shape G of the multiple focus lens 40 is φ30, the radius of curvature of the cylindrical surface 40a is R=135, the width I of the cylindrical surface 40a is 15.5 mm, the radius of curvature of the aspherical surface 40c calculated by substituting $R_0$ =16 and K=−0.52 in an equation shown below is Z, the thickness J of the multiple focus lens 40 is 10 mm, and a semiconductor laser diode 41 having its directionalities shown in FIGS. 10A and 10B is disposed at a position of L=20 mm on the optical axis of the cylindrical surface 40a. The semiconductor laser diode 41 is disposed so that the directionality shown in FIG.

10A is parallel to the R direction of the cylindrical surface 40a.

$$Z=ch^2/[1+\{1-(K+1)c^2h^2\}^{1/2}]+Ah^4 \quad (1)$$

$$(h^2=x^2+y^2 \quad c=1/R_0)$$

Figure 11:
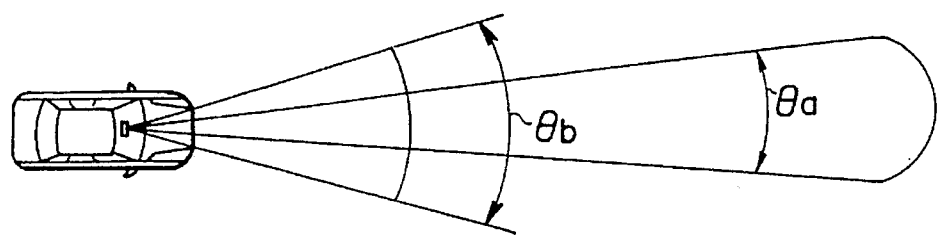
FIG. 11 is a configurational diagram conceptually showing an emergence pattern of light from the multiple focus lens 40 in the fourth embodiment.

In the optical radar apparatus set and arranged as described above, light is emitted by the semiconductor laser diode 41 in an emergence pattern such as that shown in FIG. 11. At this time, the expansion angle θa for a long-distance area is 2.96° while the expansion angle θb for a short-distance area is 9.8°.

An example of a modification of this embodiment may be such that, in the multiple focus lens 40 shown in FIG. 9, a diffusing flat surface plate (corresponding to the diffusing flat surface portion), for example, is used in place of the flat surface 40b, and this diffusing flat surface plate 40b and a spherical lens having the cylindrical surface 40a or the like (corresponding to the focus portion) are combined. In this case, however, light emerges only from the flat surface 40b, i.e., the diffusing flat surface plate for the short-distance area. Therefore, the light is diffused and weakened by the diffusing flat surface plate, thereby slightly reducing the detection distance.

Figure 12A:
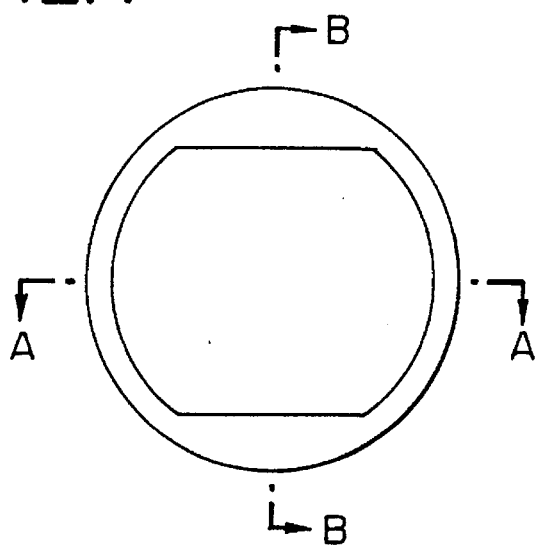
FIGS. 12A, 12B, 12C are schematic configurational diagrams schematically showing a multiple focus lens 53 in the fifth embodiment of the present invention.
Figure 12B:
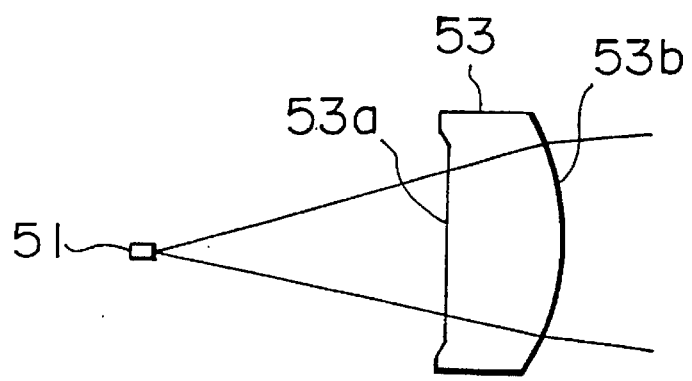
Figure 12C:
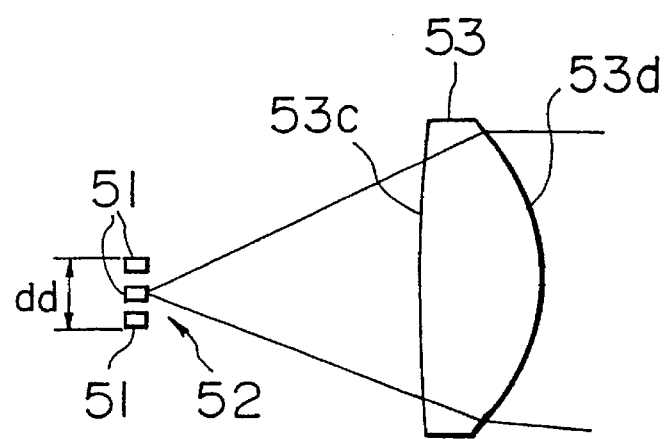

Next, the fifth embodiment of the present invention will be described with reference to FIGS. 12A to 12C. In the fifth embodiment, as shown in FIG. 12C, light sources 52 formed of three arrays of semiconductor laser diodes 51 are used along with a multiple focus lens combining an aspherical surface to form an emergence pattern of light by three beams. FIG. 12B is a cross-sectional view taken along the line B—B of FIG. 12A, and FIG. 12C is a cross-sectional view taken along the line A—A of FIG. 12A.

The multiple focus lens 53 is formed by, as viewed in the cross-sectional view shown in FIG. 12B, a spherical surface 53b having a predetermined curvature and an aspherical surface 53a having a curvature calculated by an equation 2 shown below, and is formed by, as viewed in the cross-sectional view shown in FIG. 12C, a spherical surface 53d having a predetermined curvature and an aspherical surface 53c having a curvature calculated by an equation 3 shown below.

$$X=c_0Y^2/[1+\{1-c_0^2Y^2\}^{1/2}]-\Sigma A_i|Y|^i \quad (2)$$

$$X=c_0Z^2/[1+\{1-c_0^2Z^2\}^{1/2}]-\Sigma A_i|Z|^i \quad (3)$$

Figure 13:
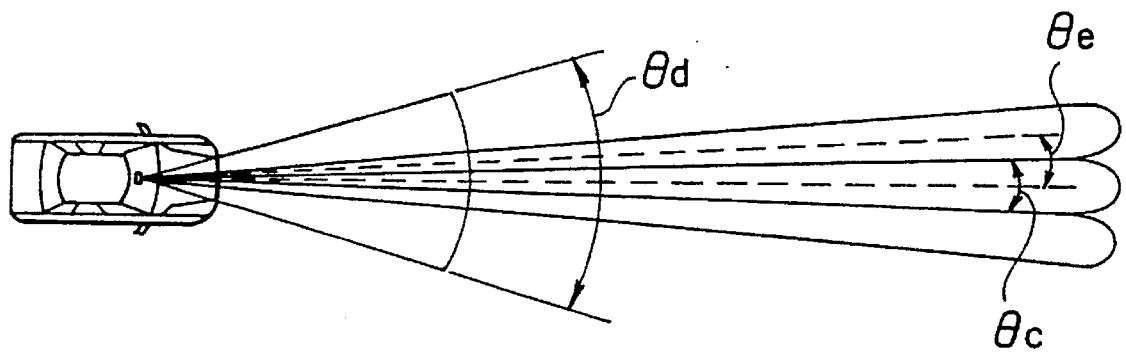
FIG. 13 is a conceptional diagram conceptually showing an emergence pattern of light from the multiple focus lens 53 in the fifth embodiment.

In the case of using the multiple focus lens 53 having different curvatures at different viewing angles along with light sources 52 formed of three arrays of semiconductor laser diodes 51 as mentioned above, a resulting emergence pattern of light has a three-beam configuration as shown in FIG. 13.

In this case, if the distance dd between laser chips of the three arrays is set to 0.5 mm and if the light sources 52 are disposed so that the directionality of FIG. 13B is parallel to the plane of paper, then an expansion angle θc for a long-distance area of one beam is 1°, an expansion angle θe between the beam optical axes is 1°, and an expansion angle θd for a short-distance area of the three beams as a whole is 10°. In this embodiment, the number of beams, which is three in this embodiments, may be any number while the same design is adopted.

Figure 14:
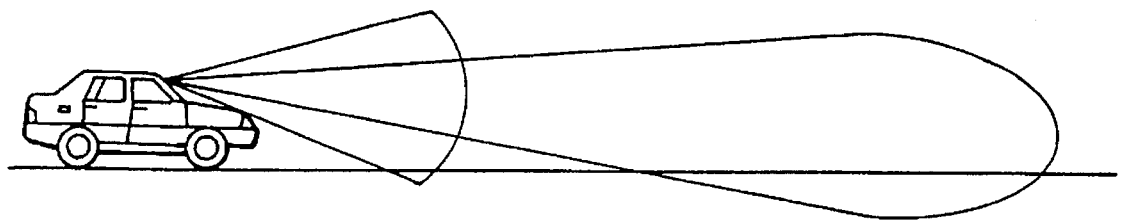
FIG. 14 is a conceptional diagram conceptually showing an emergence pattern of light from a lens in a fifth embodiment of the present invention.

Next, the sixth embodiment of the present invention will be described. With respect to the first to fifth embodiments, only expansion of light in the horizontal direction was described. However, expansion of light in a vertical direction may be taken into consideration, for example, by changing the spherical surface 53b of the multiple focus lens 53 of the fifth embodiment into an aspherical surface at least having a curvature calculated by the equation 2. For example, in such a case, an emergence pattern of light such as the pattern shown in FIG. 13 is exhibited in the horizontal direction, while a pattern such as that shown in FIG. 14 is exhibited in the vertical direction.

If an expansion in a vertical direction is provided in this manner, it is specifically preferable to set the light transmitter and light receiver portions of the optical radar apparatus on a rearview mirror portion in a vehicle passenger chamber.

That is, in a case where an expansion in a vertical direction is to be provided, there is a need to prevent the bonnet of a vehicle using the apparatus from reflecting light and stopping the light from traveling in the desired direction, and setting in an upper position is therefore preferred. In the case of setting outside the vehicle, however, the detection accuracy may be reduced by occurrence of a dust contamination or the like upon light transmitting, receiving or the like.

Then, the light transmitter and light receiver portions of the optical radar apparatus are disposed not only in the vehicle passenger compartment but also in the range of wiping of a windshield wiper for removing a contamination on a windshield, thereby enabling the windshield wiper to remove a contamination on the windshield in front of the light transmitter and light receiver portions of the optical radar apparatus. The detection accuracy can be thereby maintained as high as possible.

The present invention is not limited to the above-described embodiments and can be practiced in various forms in a scope such as not to depart from the gist of the invention.

INDUSTRIAL APPLICABILITY

In the present invention, as described above, a long-distance area and a short-distance area can be simultaneously set as detection ranges according to the optical device, the light source and the placement relationship between the optical device and the light source. It is therefore possible to increase the expansion angle in a road surface direction in the short-distance area without setting the detection ranges one-sidedly and without sacrificing the maximum detection distance. Specifically, if the present invention is applied to a radar apparatus for use with a constant-speed traveling apparatus mounted on a vehicle, the expansion angle in a road surface direction in the short-distance area can be increased without setting the detection ranges one-sidedly and without sacrificing the maximum detection distance. It is thereby possible to accurately detecting obstacles existing in the vicinity of the vehicle while maintaining a suitable distance between the vehicle and another vehicle.

What is claimed is:

1. An optical radar apparatus for a vehicle having a light transmitter for emitting a beam of light, from a front side of said vehicle toward an object, a light receiver for receiving reflected light from said object, and distance calculating means for calculating a distance to said object based on said beam of light and said reflected light, said light transmitter comprising:

an optical device including an n-focus lens (n is equal to or greater than 2) formed of at least a first focus portion having a first focal length and a second focus portion, first and second parts of which are respectively disposed on opposite sides of said first focus portion, said second focus portion having a second focal length longer than the first focal length, said first and second focus portions being disposed in an order of said first part of said second focus portion, said first focus portion, and said second part of said second focus portion, and disposed in one of a width and a height direction of said vehicle, from an edge of said n-focus lens to an opposite edge of said n-focus lens; and a light source provided in a position at a distance equal to or shorter than the first focal length from said optical device, said light source emitting light to said optical device so that light is emitted toward said front side of said vehicle through said first focus portion and said second focus portion.

2. An optical radar apparatus for a vehicle according to claim 1, wherein said optical device is formed of a hologram.

3. An optical radar apparatus for a vehicle according to claim 1, wherein said optical device has:

a cylindrical surface having a predetermined focal length, said cylindrical surface being disposed at a side of said optical device where light from said light source enters said optical device;

a flat surface disposed adjacent to said cylindrical surface at said side of said optical device where light from said light source enters said optical device; and an aspherical surface disposed on a side of said optical device other than said side where light from said light source enters said optical device;

said first focus portion being formed by said cylindrical surface and said aspherical surface, said second focus portion being formed by said flat surface and said aspherical surface.

4. An optical radar apparatus for a vehicle having a light transmitter for emitting a beam of light from a front side of said vehicle toward an object, a light receiver for receiving reflected light from said object, and distance calculating means for calculating a distance to said object based on said beam of light and said reflected light, said light transmitter comprising:

an optical device formed of at least a focus portion having a predetermined focal length, and a diffusing flat surface portion disposed adjacent to said focus portion; and a light source provided in a position at a distance equal to or shorter than the predetermined focal length from said optical device, said light source emitting light to said optical device so that light travels to outwardly through said focus portion and said diffusing flat surface portion.

5. An optical radar system comprising:

a light source;

a lens for focusing light from said light source, said lens having a first portion having a first focal length and a second portion having a second focal length different from said first focal length;

a receiver for generating an electrical signal representative of reflected light from said light source, said reflected light from said light source being focused by said lens; and distance calculating means, operatively connected to said light source and said receiver, for calculating a distance of a reflection point of said reflected light;

wherein said lens has a diffusing surface.

6. The optical radar system of claim 5, wherein said lens has a cylindrical surface.

7. A mobile optical radar unit comprising:

an automobile; and an optical radar system mounted in said automobile, said optical radar system including
a light source,
a lens for focusing light from said light source and projecting said focused light to an exterior of said automobile, said lens having a first portion having a first focal length and a second portion having a second focal length different from said first focal length,
a receiver for generating an electrical signal representative of light reflected to said automobile from said light source, said light reflected to said automobile from said light source being focused by said lens, and
distance calculating means, operatively connected to said light source and said receiver, for calculating a distance of a reflection point of said reflected light from said automobile;

wherein said lens has a diffusing surface.

8. The mobile optical radar unit of claim 7, wherein said lens has a cylindrical surface.

* * * * *